Jan. 12, 1965  P. TELL  3,165,750
DELAY TYPE LENS CONSISTING OF MULTIPLE IDENTICAL FOAMED
BLOCKS VARIABLY LOADED BY INTERLINKING INSERTED RODS
Filed Nov. 28, 1962
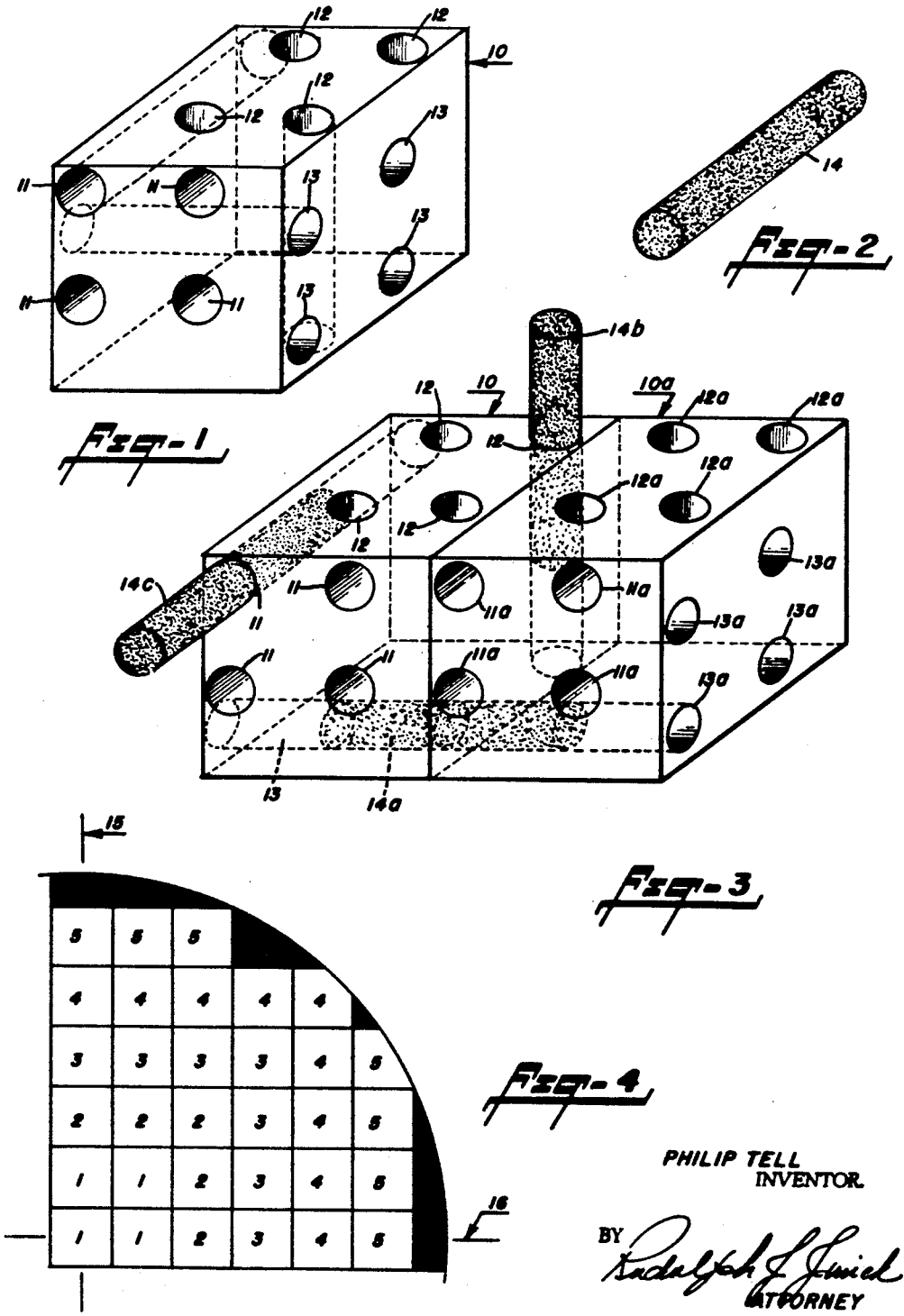
PHILIP TELL
INVENTOR.
BY
ATTORNEY United States Patent Office 3,165,750
Patented Jan. 12, 1965

3,165,750
DELAY TYPE LENS CONSISTING OF MULTIPLE IDENTICAL FOAMED BLOCKS VARIABLY LOADED BY INTERLINKING INSERTED RODS
Philip Tell, Summit, N.J., assignor to Tellite Corporation, Orange, N.J., a corporation of Delaware
Filed Nov. 28, 1962, Ser. No. 240,604
12 Claims. (Cl. 343—911)

This invention relates to a dielectric delay type lens for focusing radio beams and to a novel method of constructing such lens.

A delay type lens of the type to which this invention is directed is known as a Luneberg lens. Such lens has the property of focusing radio waves in the ultra high frequency and lower micro wave ranges, focus being achieved by variations of the artificial dielectric constant of the dielectric interposed in the path of the received radio beams. The Luneberg lens generally is a sphere of refractive, dielectric material having isotropic properties and having an effective focal length depending upon the particular design. It is used with an array of radio wave receiver horns distributed along a great circle of the sphere. Such horns, if appropriately spaced with a certain degree of overlap, will see a solid angle in space. If such an array is rotated about an axis lying in the plane of its great circle, the horns can be caused to scan all space, or any desired portion thereof.

Mechanical aspects, as well as functional parameters, present serious problems in the construction and use of a delay type lens in its final form. Even if the factor of economy be disregarded, there exists a critical need for a method and means of constructing a Luneberg type delay lens having an isotropic refractive index. Attempts have been made to construct such lenses by an assembly of foamed polystyrene blocks having metal particles dispersed throughout each block. In order to obtain the required refractive index, a predetermined quantity of metal particles is mixed with the pre-expanded material and the mixture foamed in a closed cavity. However, this procedure has proven to be impractical for several reasons. It is very difficult to foam a fairly large, solid block of polystyrene which will have a uniform density throughout the block. The material is converted to a solid, foamed structure by means of heat, generally steam. The heat must be introduced rapidly and, importantly, must also be removed just as rapidly. Since the material is self-insulating it becomes proportionately difficult to properly foam the core of a solid block, say, a one foot cube. Further, the distribution of the metal particles is haphazard and consequently the finished, foamed block does not provide a uniform, constant refractive index in all directions. Still further, the foamed blocks must be cemented together to form a lens of practical dimensions, which introduces other structural, as well as electrical, problems.

The method and means for constructing a Luneberg lens in accordance with this invention, overcomes the shortcomings and disadvantages of prior practice and makes possible the construction of an isotropic lens of any desired size and configuration.

An object of this invention is the provision of a practical, economical method of constructing a delay type lens having substantially the same refractive index in all directions.

An object of this invention is the provision of a method of constructing a Luneberg type lens of a plurality of foamed plastic blocks, which method includes means for selectively varying the refractive index of each foamed block and means for interlockingly assembling the blocks into a sturdy structure without the use of cement.

An object of this invention is the provision of a delay lens for radio waves constructed of blocks of dielectric material and having an isotropic refractive index.

An object of this invention is the provision of a Luneberg type lens constructed of a plurality of cubical modules of foamed, dielectric material, which modules are each provided with a plurality of apertures having axes lying in three mutually perpendicular planes, with the modules interlockingly secured together by solid rods of foamed, dielectric material having metal particles embedded therein, said rods being inserted into aligned apertures of adjacently-disposed modules.

These and other objects and advantages will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIGURE 1 is an isometric view of a cubical block made in accordance with this invention;

FIGURE 2 is an isometric view of a rod to be inserted into an aperture of the block;

FIGURE 3 is a fragmentary, phantom view showing how the rods are used to interlock adjacently-disposed blocks; and FIGURE 5 is a diagrammatic presentation showing how the blocks are assembled to form a lens.

Reference, now, is made to FIGURE 1 wherein there is shown a block 10 having three sets of apertures 11, 12 and 13 extending therethrough. It will be noted that the apertures of each set have axes lying in three mutually perpendicular planes. It is pointed out that the apertures are all of the same diameter, which diameter is so chosen that the apertures do not intersect, that is, each aperture is defined by an unbroken wall. Further, the thickness of the thinnest wall section between adjacent apertures is made as small as possible consistent with structural and production considerations. The block, preferably a one foot cube, is foamed polystyrene with the apertures formed during the foaming process. This is accomplished by placing the pre-foamed material into a closed mold provided with hollow cores corresponding to the number, size and disposition of the apertures to be formed. Steam is then applied around the mold and through the cores thereby foaming the material. In such arrangement, the necessary heat can be applied and removed quickly, promoting a rapid, thorough foaming of the material. Further, since no area of the material is far removed from the heat, there results a uniform foaming of the entire mass of material. Additionally, surface areas of the foamed material carry what is known as a skin stress which renders such surface areas substantially more resistant to deformation than internal areas. Consequently, the foamed cube, provided with the multiplicity of walls forming the apertures, includes a relatively large, total skin stress area, thereby adding materially to the overall strength of the cube.

FIGURE 2 illustrates one of the solid rods 14 designed to fit snugly into any of the cube apertures and having an axial length equal to that of an aperture. The rod is made by thoroughly mixing a predetermined quantity of metal particles, or slivers, such as aluminum or copper, into the prefoamed polyethylene material. Such mixture is then foamed in a closed mold, the dimensions of the rod being such that the material is foamed rapidly and uniformly by the introduction of heat, in the form of steam, around the entire mold. The metal particles are thereby substantially uniformly dispersed throughout the rod and the refractive index of the completed rod is related to the ratio of metal particles to the foamed polystyrene.

A plurality of rods are made and then graded into groups in terms of the refractive index. If, now, rods having the same refractive index are inserted fully into each of the cube apertures, there results a strong, solid cube having a substantially isotropic refractive index. Cubes so made can be assembled in side-by-side, abutting relation for the construction of a Luneberg type lens. The cubes, at the lens core, would have the highest refractive index, while the cubes at the outer surface would have the lowest refractive index. Intervening blocks are selected so that the refractive index of the completed sphere would vary progressively from a maximum value at the core to a minimum value at the surface.

In addition to providing a practical, economical means for the formation of a cube having an isotropic refractive index of predetermined value, the rods also serve as a convenient means for the interlocking assembly of a plurality of adjacently-disposed cubes, without the use of an adhesive which introduces problems of a structural and electrical character. The interlocking assembly of adjacently-disposed cubes is illustrated in the phantom view of FIGURE 3. When the two identical cubes 10 and 10a are in aligned, abutting orientation, the one set of apertures of one cube will be in axial alignment with the corresponding set of apertures in the adjacent cube as, for example, the aligned apertures 13 and 13a. Thus, one or more of the rods (such as the illustrated rod 14a) can be positioned within such aligned apertures of the two cubes. Similarly, one or more of the rods lying in other planes, such as the rods 14b and 14c, can be positioned within aligned apertures of adjacent cubes, abutting, respectively, the top and front surface of the illustrated cube 10. The extent to which a particular rod is positioned within an aligned aperture of one or the other of adjacently-disposed cubes can be varied, although, in general, the rod will be symmetrically positioned within each tube.

If, now, a plurality of cubes are interlockingly assembled by rods equally positioned within one of the associated, aligned apertures and the refractive index of each rod is known, it will be apparent that the refractive index of the resulting assembly can be made to vary progressively from cube to cube.

Reference is now made to FIGURE 4 which is a diagrammatic representation of one planar quadrant of a spherical delay lens constructed of cubical modules interlocked as described hereinabove, with the mutually perpendicular great circles identified by the numerals 15 and 16. The cubes numbered 1 are located at the core of the lens and are interlocked by rods having equal refractive indexes, but of relatively highest value. The cubes numbered 5, at the outer surface, are interlocked to the adjacent cubes by rods having equal refractive indexes, but of relatively lowest value. The intermediate cubes 3 are interlocked to adjacent cubes by rods having equal and intermediate index of refraction values. In actual practice, many more cubes are required to construct a lens of practical size, but it will be apparent that by the proper selection and positioning of the rods, the refractive index of the lens can be made to vary progressively from a predetermined maximum value at the lens core to a predetermined minimum value at the lens surface. Thus, radio beams coming from a direction in the plane of a great circle of the lens, will be subjected to greater refraction than those beams striking the sphere obliquely, whereby all beams are brought to a given focal point. Consequently, an array of receiving horns rotated about an axis lying in the plane of a great circle can be caused to scan all of the space.

From the above description of the invention, it will now be clear that the foamed polystyrene cubes, and the rods carrying the metal particles, can be made on a practical basis, at relatively low cost. The multiple function of the rods, namely, as a means for convenient, interlocking assembly of the cubes and as a means for obtaining a desired refractive index at a particular section of the lens, makes it possible to construct a Luneberg type lens rapidly, practically, and economically. A lens so constructed possesses excellent structural and electrical properties which are of paramount importance in a device of this type.

Inasmuch as the assembly of cubes requires no adhesive, the cubes may be assembled and disassembled with maximum facility and without damage of the cubes or rods. This permits the construction of a lens on what may be termed an empirical basis, making such measurements of the index of refraction, during construction of the lens, as may be necessary to produce a lens of desired electrical characteristics.

Although the invention has been described with particular reference to a one foot cubical module, or block, it will be apparent that the inventive features are equally applicable to modules of other size and shape. Uniform, circular apertures, in each module, are desirable in the interest of production and ease of assembly, but non-uniform apertures of other cross-sectional form may be utilized to meet specific requirements. Although foamed polystyrene is a preferred material for the construction of the modules and/or rods, because of its light weight, strength and dielectric properties, other materials can be used in the practice of the invention.

Those skilled in this art will find no difficulty in making changes and modifications to adapt the method and means herein specifically disclosed to meet specific requirements in this field. It is intended that such changes and modifications shall fall within the scope and spirit of the invention as recited in the following claims.

I claim:

1. A method of imparting a predetermined electrical characteristic to a block of dielectric material which method comprises forming a plurality of sets of apertures in the block, which sets of apertures have axes lying in three mutually perpendicular planes, and inserting into the apertures rods of plastic, said rods fitting snugly within the apertures and having a predetermined quantity of metal particles substantially uniformly dispersed therethrough.

2. The method according to claim 1, wherein the block is formed of a foamed plastic with the apertures formed during the foaming process.

3. The invention as recited in claim 2, wherein the said rods are formed of a similar foamed plastic.

4. A method of making a block of dielectric material having a predetermined refractive index, which method comprises foaming polystyrene into block form while simultaneously forming therein three sets of apertures having axes lying in three mutually perpendicular planes; forming a plurality of rods of foamed polystyrene, each rod being adapted to fit snugly with an aperture and having a predetermined quantity of metal particles substantially uniformly dispersed therethrough, measuring the refractive index of each rod; and inserting rods having a selected refractive index into selected apertures, thereby to provide a predetermined refractive index measured in a given direction through the block.

5. A method of constructing a Luneberg type lens which method comprises forming a plurality of foamed blocks of dielectric material, each block having three sets of apertures formed therein during the foaming process with the axes of said sets of apertures lying in three mutually perpendicular planes; forming a plurality of rods of foamed polystyrene, said rods conforming in size to the said apertures and each rod having a predetermined quantity of metal particles substantially uniformly dispersed therethrough; measuring the refractive index of each rod; assembling the blocks in side-by-side, abutting relation; inserting selected rods through aligned apertures in adjacently-disposed blocks such that the refractive index of the lens varies progressively from a maximum value at the lens core to a minimum value at the outer surface.

6. The invention as recited in claim 5, wherein the blocks are cubes, the apertures and rods are all of uniform circular cross section, and the length of each rod equals the width of the cube.

7. A module useful for the construction of a Luneberg type lens comprising a block of dielectric material having parallel opposed surfaces, means forming three sets of apertures in said block, the axes of each set of apertures lying in three mutually perpendicular planes, and solid rods of dielectric material snugly disposed in each of the apertures, said rods each having a predetermined quantity of metal particles substantially uniformly dispersed therethrough.

8. The invention as recited in claim 7, wherein the blocks are cubes of foamed polystyrene, the apertures are of uniform circular cross section, and the rods are of foamed polystyrene.

9. An assembly comprising a plurality of blocks of foamed polystyrene positioned in side-by-side abutting relation, each block having formed therein three sets of apertures with the axes of each set lying in mutually perpendicular planes; and solid rods of foamed polystyrene disposed in aligned apertures of adjacently-disposed blocks, said rods having metal particles substantially uniformly dispersed therethrough.

10. The invention as recited in claim 9, wherein the blocks are cubes and the apertures are all of the same, uniform cross section.

11. A Luneberg type lens comprising a plurality of foamed plastic blocks disposed in side-by-side abutting relation; means forming three sets of apertures in each block with the axes of each set lying in mutually perpendicular planes; solid rods of foamed plastic having a predetermined quantity of metal particles substantially uniformly dispersed therethrough, said rods being snugly disposed within the block apertures with at least one rod in each plane positioned within aligned apertures of adjacently-disposed blocks, the rods being positioned such that the refractive index of the lens varies progressively from a maximum value at the lens core to a minimum value at the outer surface.

12. The invention as recited in claim 11, wherein the blocks are foamed polystyrene cubes with the said apertures formed during the foaming process.

References Cited in the file of this patent
UNITED STATES PATENTS 2,866,971    Kelleher _____ Dec. 30, 1958

OTHER REFERENCES

Brown: Artificial Dielectrics, Proceeding I.E.E., London, vol. 100, Part IV, No. 5, pages 51–62, October 1953.

Kelleher et al.: Dielectric Lens, August 1955, Electronics, pages 142–145.